Figure 1:
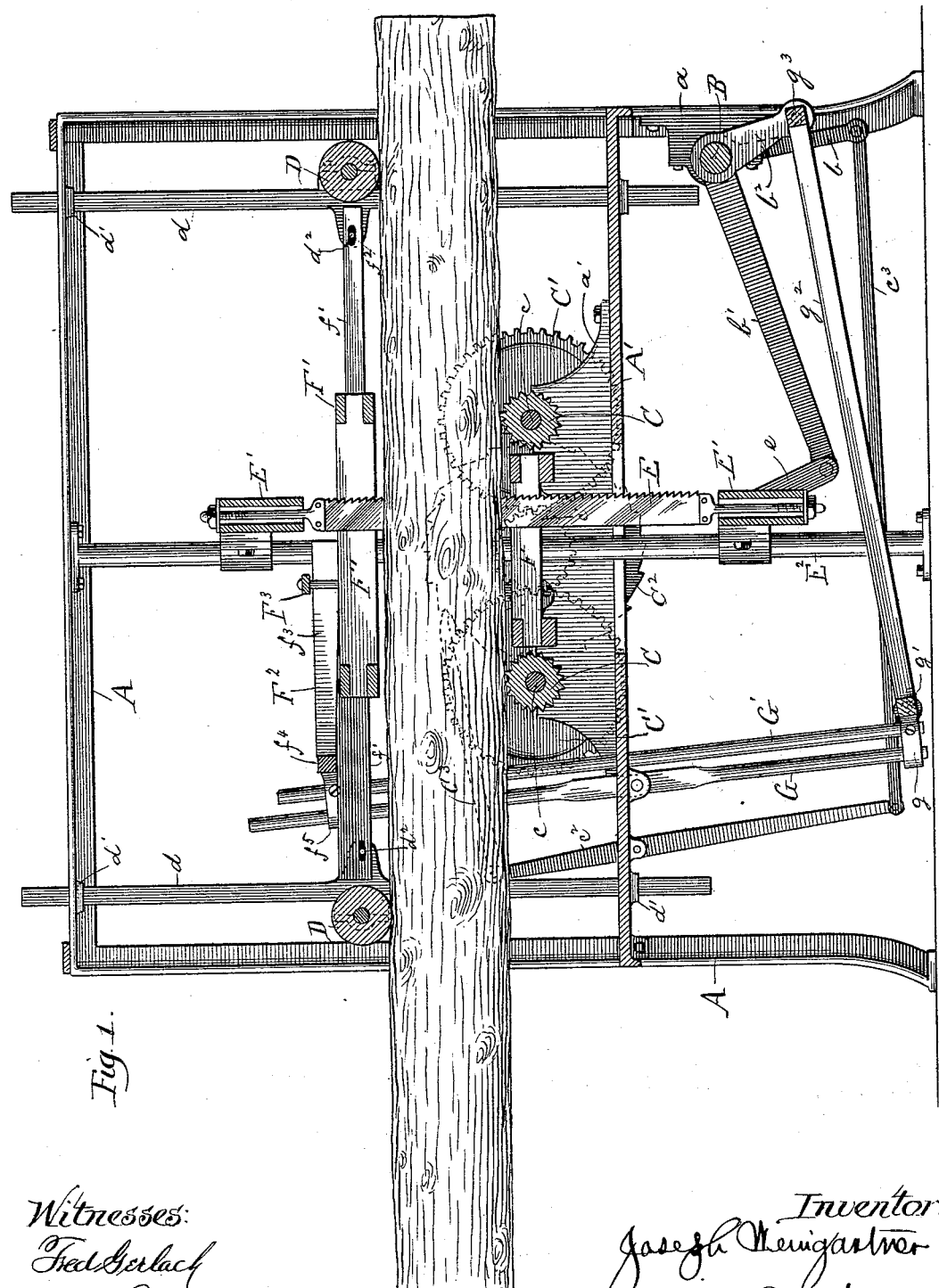

(No Model.) 2 Sheets—Sheet 1.

J. WEINGARTNER.
GANG SAW ATTACHMENT.

No. 498,594. Patented May 30, 1893.

Witnesses:
Fred Gerlach
Otto Luerkert

Inventor:
Joseph Weingartner
By John Kennedy
Attorneys (No Model.) 2 Sheets—Sheet 2.
J. WEINGARTNER.
GANG SAW ATTACHMENT.
No. 498,594. Patented May 30, 1893.
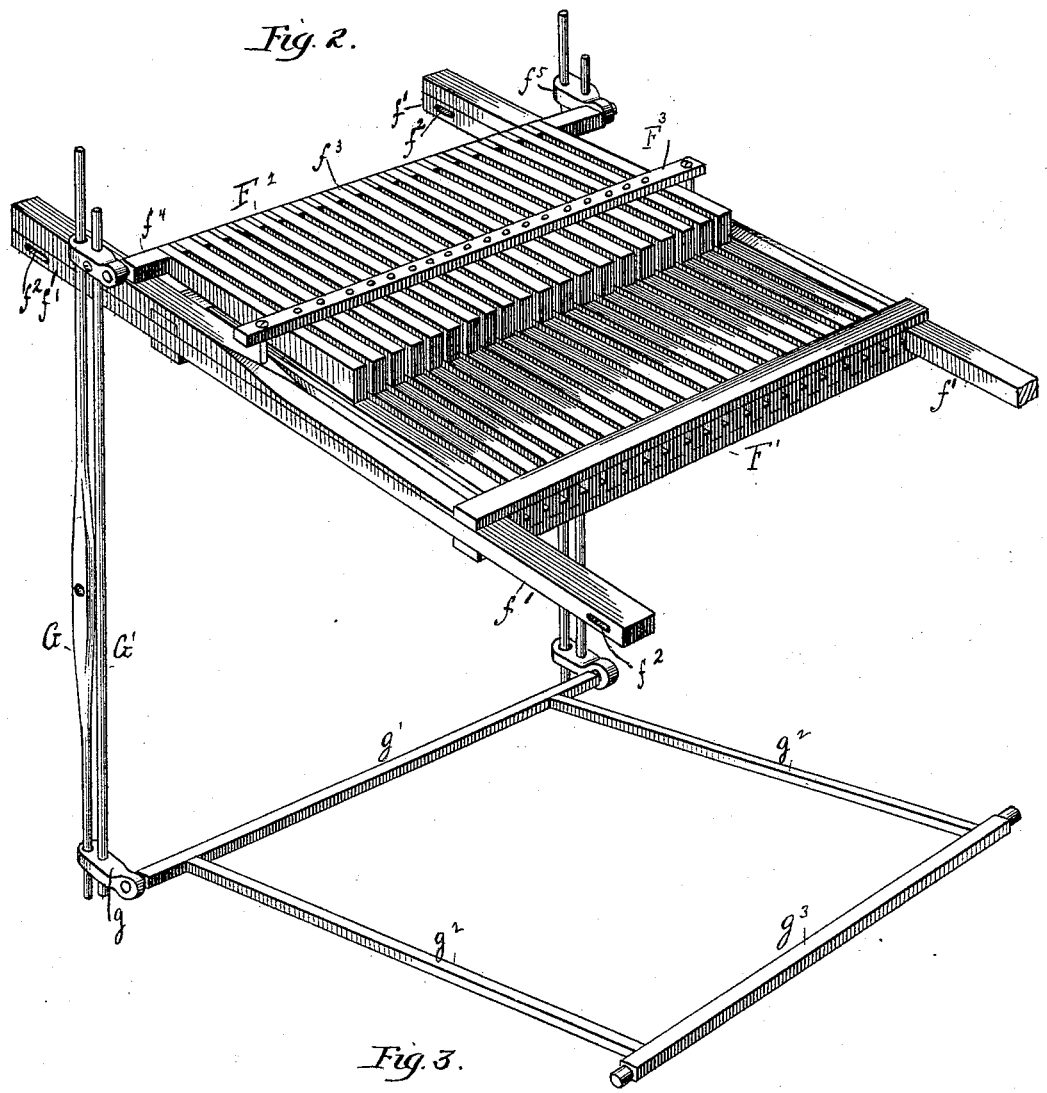
Fig. 2.
Fig. 3.
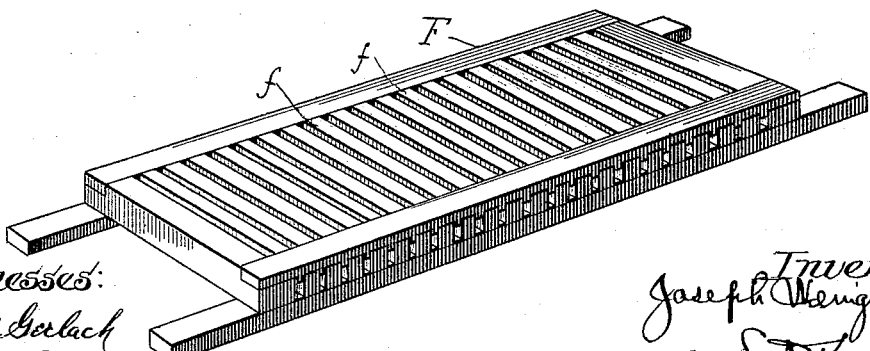
Witnesses:
Fred Gerlach
Otto Duckert
Inventor:
Joseph Weingartner
By Lot Kennedy
Attorneys

UNITED STATES PATENT OFFICE.

JOSEPH WEINGARTNER, OF MANISTIQUE, MICHIGAN.

GANG-SAW ATTACHMENT.

SPECIFICATION forming part of Letters Patent No. 498,594, dated May 30, 1893.

Application filed September 14, 1891. Serial No. 405,589. (No model.)

*To all whom it may concern:*

Be it known that I, JOSEPH WEINGARTNER, a citizen of the Empire of Germany, residing at Manistique, in the county of Schoolcraft and State of Michigan, have invented certain new and useful Improvements in Gang-Saw Attachments; and I do hereby declare the following to be a full, clear, and exact description of the invention, such as will enable others skilled in the art to which it appertains to make and use the same.

This invention relates to a novel improvement in sawing machines of that class known as gang-saws and which comprise a plurality of parallel, reciprocating saw blades.

The object of the invention is to provide a machine of the character with devices that are adapted to prevent the accumulation of chunks, splinters and other articles, that are liable to injure the blades or obstruct their operation, between said blades or at places where they are liable to interfere with the operation of the device.

The invention consists in the features of construction and combinations of parts hereinafter fully described and pointed out in the appended claims.

In the accompanying drawings, illustrating my invention, Figure 1 is a view partly in longitudinal vertical section and partly in side elevation of a sawing machine embodying my invention. Fig. 2 is a detail perspective view of the upper grate or chunk catcher and its operating devices. Fig. 3 is a detail view of the lower grate or chunk catcher.

Referring to said drawings, A, indicates the frame work or supporting frame of an ordinary gang sawing machine.

B, indicates a rock-shaft which serves to communicate power to the different operating parts of the device, and which is supported in suitable bearings, $a$, on the said supporting frame and preferably near the lower portion thereof. Above said shaft is a table, A', upon which the feed devices for feeding the log or piece being sawed are located, said table being suitably secured to and supported from said supporting frame. The said feed devices comprise toothed wheels or rollers, C, C, rigidly mounted upon transversely arranged shafts, $c$, $c$, which are supported in bearings formed in plates, $a'$, rising from said table, A'. Large gears, C', C', are also rigidly mounted upon said shafts, $c$, conveniently to one side of the machine, and said gear wheels, C', intermesh with a gear pinion, $c'$, supported in bearings in said plates, $a'$. A large ratchet wheel, $C^2$, is connected with said gear pinion, $c'$, and serves to communicate motion to the same. A pawl, $C^3$, (shown in dotted lines) engages said ratchet wheel, $C^2$, at one end and at its other end is pivoted to the upper end of a vertically arranged vibratory lever, $c^2$, pivoted to the table, A'. The lower end of said lever, $c^2$, is connected by means of a link, $c^3$, with the end of a crank arm, $b$, fastened to the rock-shaft, B. It is obvious that, as said shaft, B, rocks in its bearings, the ratchet wheel will be turned through the intermediacy of the crank arm, $b$, link, $c^3$, lever, $c^2$, and pawl, $C^3$, and the turning of the ratchet wheel, $C^2$, serves, through the intermediacy of the gearing described, to turn the feed rollers, C, in a direction to feed the work forward. The work rests upon said feed rollers and is held therein by means of pressure rollers, D, D, carried by vertically arranged rods, $d$, $d$, which are adapted to rise and fall vertically in corresponding guideways or apertures, $d'$, $d'$, formed in the upper part of the supporting frame and in the table, A'. The rods, $d$, can be suitably weighted or spring pressed to cause the pressure rollers to bear with sufficient pressure upon the feed rollers to cause the latter to feed the work. The sliding bearings permit the pressure rollers, D, to accommodate themselves to the inequalities in thickness of the work, such as for instance, a log which is shown in the drawings.

The sawing devices comprise a plurality of saw blades, E, which are arranged parallel with each other. In Fig. 1 only one of said saw blades is shown, as the others are located directly behind it. The said saw blades are connected at their upper and lower ends to the cross-heads, E', E', which are provided with guide-ways sliding on the vertical guiderods, $E^2$. The lower cross-head, E', is connected by means of a short pivoted arm, $e$, with a long arm, $b'$, rigidly mounted upon the rock-shaft, B, so that as the said rock-shaft reciprocates said saws will be alternately elevated and depressed in an obvious manner.

In accordance with the broad idea comprehended by my invention, I arrange a grating, F, below the line traversed by the lower edge of the work, and a grating, F', above the work. The grating, F, consists of an oblong frame, as shown in detail in Fig. 3, provided with transversely arranged slats, $f$. The distance between the slats is large enough to permit the passage of one of the saw blades, and the width of the slats is about the distance between two saw blades; as shown in Fig. 1, this grating, F, is located a slight distance below the upper edges of the feed rollers and transversely across the frame of the device with a saw blade located between each slat. It will be obvious that during the sawing operation and the forward feed of the log shown, if any chunks or pieces should fall from the lower side of the log, they will be caught upon the grating, F, and thereby prevented from getting in between the saw blades or otherwise injuring the operative parts of the device. It will be manifest that this grating prevents any chunks from getting between the saws and lodging in the ends thereof, which, if such clogging became of such dimensions as to meet the lower face of the work, would be liable to break some parts of the device. The grating, F', which is arranged above the work is similar to the grating, F, in general construction, and operates the same. It is, however, provided at its ends with forwardly and rearwardly extending arms, $f'$, $f'$, having longitudinally arranged slots, $f^2$, near their outer ends which engage pins, $d^2$, on the sliding rods, $d$. This connection between the grating, F', and the rods serves to hold the said grating a proper distance above the work and allow the same to automatically adjust itself.

In connection with the upper grating, F', is also shown a reciprocating frame or grating, $F^2$, which slides upon the upper face of the grating and serves to move or push any chunks, chips or saw-dust off the upper face of the grating, F', and to keep the latter clear. This frame, $F^2$, consists of a plurality of bars, $f^3$, arranged similarly to those of grating, F', and connected together at their rear ends only by a cross bar, $f^4$, by means of which the said frame is moved forwardly and rearwardly upon the grating, $F^2$.

$F^3$, is a guide which is supported from the grating, F', and extends across the top of the frame, $F^2$, and forms a guide for the reciprocating frame.

The devices for reciprocating said frame are constructed as follows: To the ends of the rear bar, $f^4$, are pivoted the arms, $f^5$. A vibrating lever, G, pivoted to the table has one end passing loosely through an aperture in said arm, $f^5$, and at its lower end passes through an aperture in a pivoted arm, $g$, on the end of the bar, $g'$. This bar, $g'$, is connected by side bars, $g^2$, to a rear bar, $g^3$, which is pivoted to arms, $b^2$, mounted upon the rock-shaft, B. It will thus be seen that as the rock-shaft turns the bars, $g^2$, and $g'$, will be moved back and forth, thereby vibrating the lever, G, and reciprocating the frame, $F^2$, as set forth. G', indicates a bar which is adjustably secured to the arm, $f^5$, by means of an aperture through which it passes and a set-screw engaging said rod. The said rod, G', is adjustably connected with the lower arm, $g$, by similar means. It will thus be seen that the distance between the arms can be adjusted as found most desirable, and further that as the grating, F', rises and falls owing to the inequalities in the thickness of the work, the arms, $f^5$, will slide up and down upon the upper ends of the levers, G, and the rods, G', moving with said arms, $f^5$, serve to move the arms, $g$, upon the lever, G, thereby preserving the integrity of the connection between the reciprocating frame and its operating devices.

It will be seen that the parts are so arranged that the frame, $F^2$, will be moved forward as the saws ascend, so as to push away from between the saws any saw-dust or particles that may accumulate.

I claim as my invention—

1. In a sawing machine the combination with the main frame, a plurality of vertically reciprocating saws, work supporting and feeding devices adapted to advance the work horizontally, a horizontal grating located above the work supporting devices and consisting of a series of slats extending between the saws, said grating resting on and thus adapted to be sustained by the advancing work and freely movable to a limited extent in a vertical direction.

2. In a sawing machine the combination of the main frame, a plurality of vertically reciprocating saws, work supporting and feeding devices adapted to advance the work horizontally, a fixed horizontal grating located below the work supporting devices and consisting of a series of slats extending between the saws, a horizontal grating located above the work supporting devices with the slats extending between the saws, said grating resting on and thus adapted to be sustained by the advancing work and movable freely vertically to a limited extent.

3. In a sawing machine the combination of a plurality of saws, work supporting devices, a frame movable at right angles to the line of feed, and a grating carried by said frame above the work supporting devices, and comprising a series of slats extending between the saws.

4. In a sawing machine the combination of the main frame, a plurality of vertically reciprocating saws, work supporting and feeding devices adapted to act on the under side of the work, pressure rollers adapted to act on the upper side of the work, a vertically moving frame in which said rollers are journaled, and a horizontal grating mounted in said frame and comprising a series of slats extending between the saws.

5. In a sawing machine the combination of a plurality of saws, work supporting devices, and a grating located above the work supporting devices and comprising a series of slats extending between the saws, said grating so sustained that it may move to a limited extent both in line with and at right angles to the direction of feed.

6. In a sawing machine the combination of the main frame, a plurality of vertically reciprocating saw blades, supporting and feeding devices adapted to advance the work horizontally, a vertically movable frame adapted to rest upon the upper side of the advancing work, and a horizontal grating sustained by said frame and movable to a limited extent with relation thereto in the direction of feed, said grating comprising a series of slats extending between the saws.

7. In a sawing machine the combination of a plurality of saws, work supporting devices, a horizontal grating located above said work supporting devices and comprising a series of slats extending between the saws, and a horizontally movable frame acting on the upper face of the grating to free the same of chips, &c.

8. In a sawing machine the combination of a plurality of saws, work supporting devices, a horizontal grating located above the work supporting devices and comprising a series of slats extending between the saws, and a horizontally reciprocating frame mounted to slide in guides on said grating.

9. In a sawing machine the combination of a plurality of saws, work supporting devices, a horizontal vertically movable grating located above the supporting devices, a horizontally reciprocating frame acting upon the upper side of the grating, and devices yieldingly connected therewith for reciprocating said frame.

10. In a sawing machine, having a plurality of saw blades, a grating located above the work and having its bars located between said saw blades, and a reciprocating frame having a plurality of bars corresponding with those of the frame and located upon the latter.

11. In a sawing machine the combination of a plurality of saws, work supporting devices, a grating located above the work supporting devices, a reciprocating frame movable on the upper face of the grating, a vibrating lever connected with the reciprocating frame, a rock shaft, and an arm connecting said vibrating lever with the rock shaft.

12. In a sawing machine the combination of a plurality of saws, work supporting devices, a vertically movable horizontal grating located above the work supporting devices, a reciprocating frame mounted to slide upon said grating, a vibrating lever having a yielding connection with said frame, a rock shaft and an arm carried by said rock shaft and joined to the vibrating lever by a yielding connection.

13. In a sawing machine the combination with a plurality of saws, work supporting devices, a vertically movable grating located above the work supporting devices, a horizontally reciprocating frame acting upon the upper face of the grating, an arm $f^5$ pivoted to the frame, a vibrating lever yieldingly connected therewith, a rock shaft, an arm thereon, a bar connected to said arm, the arm $g$ connected to the bar and joined yieldingly to the vibrating lever, and a rod $G'$ for holding said arms $f^5$ and $g$ in fixed relation.

14. In a sawing machine the combination with a plurality of saws, work supporting devices, a vertically movable grating located above the work supporting devices, a horizontally reciprocating frame acting upon the upper face of the grating, an arm $f^5$ pivoted to the frame, a vibrating lever yieldingly connected therewith, a rock shaft, an arm thereon, a bar connected to said arm, the arm $g$ connected to the bar and joined yieldingly to the vibrating lever, and a rod $G'$ for holding said arms $f^5$ and $g$ in fixed relation, and adjustably connected with said arms.

In testimony whereof I affix my signature in presence of two witnesses.

JOSEPH WEINGARTNER.

Witnesses:
JOSEPH BRÜCKLMAYER,
D. W. THOMPSON.